United States Patent [19]
Kim

[11] Patent Number: 4,953,646
[45] Date of Patent: Sep. 4, 1990

[54] ELECTRONIC DRIVE PROPULSION DEVICE FOR MOTOR VEHICLES

[76] Inventor: Chang H. Kim, Hyaesong Yonrip Na-Dong, Room 205, 551-9, Shinwol-Dong, Kwanak-ku, Seoul, Rep. of Korea

[21] Appl. No.: 348,134

[22] Filed: May 5, 1989

Related U.S. Application Data

[63] Continuation of Ser. No. 81,093, Aug. 3, 1987, abandoned.

[30] Foreign Application Priority Data

May 8, 1986 [KR] Rep. of Korea .......................... 11729

[51] Int. Cl.$^5$ .............................................. B60K 1/02
[52] U.S. Cl. .................... 180/65.4; 290/40 B; 318/141
[58] Field of Search ................... 180/65.1, 65.2, 65.3, 180/65.4, 65.5, 65.6, 165; 318/140, 141, 153; 290/40 C, 40 A, 4 B, 40 B

[56] References Cited

U.S. PATENT DOCUMENTS 3,515,968  6/1970  Crawford ........................... 180/65.4
3,701,556 10/1972  Richmond ......................... 290/40 B

*Primary Examiner*—Charles A. Marmor
*Assistant Examiner*—Richard Camby
*Attorney, Agent, or Firm*—Armstrong, Nikaido, Marmelstein, Kubovcik & Murray

[57] ABSTRACT

An electric drive propulsion system is composed of one or more series motor coupled directly to drive individual wheel axles of a vehicle, the motors being electrically connected directly to the output of a generator driven by the vehicle engine. A power switch is operated by the vehicle brake pedal to disconnect and connect excitation current to the generator to initiate and stop propulsion. Speed of propulsion is controlled by the accelerator pedal of the vehicle engine, the generator driven thereby providing the sole source of energy for the propulsion motors.

3 Claims, 3 Drawing Sheets

ELECTRONIC DRIVE PROPULSION DEVICE FOR MOTOR VEHICLES

This application is a continuation of application Ser. No. 081,093 filed Aug. 3, 1987 now abandoned.

FIELD OF THE INVENTION

The invention relates to an electric drive propulsion system for motor vehicles, and it is the object of the invention to eliminate the clutch, transmission gear, propeller shaft and differential gear installed in existing vehicles, connect an electric generator, and equip the rear axle with a DC series motor together with a reduction gear so as to convert the engine power into electricity, so that the energy is utilized efficiently, the weight of car body is reduced and a simplification of structure makes any beginner in driving able to drive the car without difficulty.

BACKGROUND OF THE INVENTION

According to conventional structure of motor vehicles, the engine is connected to the wheels through the clutch, transmission gear, propeller shaft and differential gear. Therefore, when a driver runs his car, a noise takes place due to engagement of gears, and the transmission fails to reach an efficient gear ratio due to a speed change in the transmission gear, which results in lots of energy loss. Moreover, an increase in the weight of the car body is caused by equipping it with many parts, such as the transmission gear, propeller shaft, differential gear, etc., and a change of speed must be made by operating both the transmission gear and the clutch. Even when the car is stopped, the clutch and the brake must be operated simultaneously in order to reduce the propulsive force of the power transmitted. For this reason, there are disadvantages and problems in that beginners in driving are unable to learn the driving techniques in a short time. Even though the driver is skilled, he has always to operate simultaneously the clutch and the transmission gear, and the clutch and the brake during running or at the time of stopping, so that he must perform these operations at all times and it causes an increase of fatigue. Frequent operation of the speed change reduces attention to safe driving so that it might give rise to an accident.

The invention is generated in an improved form for the purpose of eliminating the above-mentioned disadvantages, and its structure will now described in detail with reference to the accompanying drawings.

DETAILED DESCRIPTION OF THE INVENTION

Figure 1:
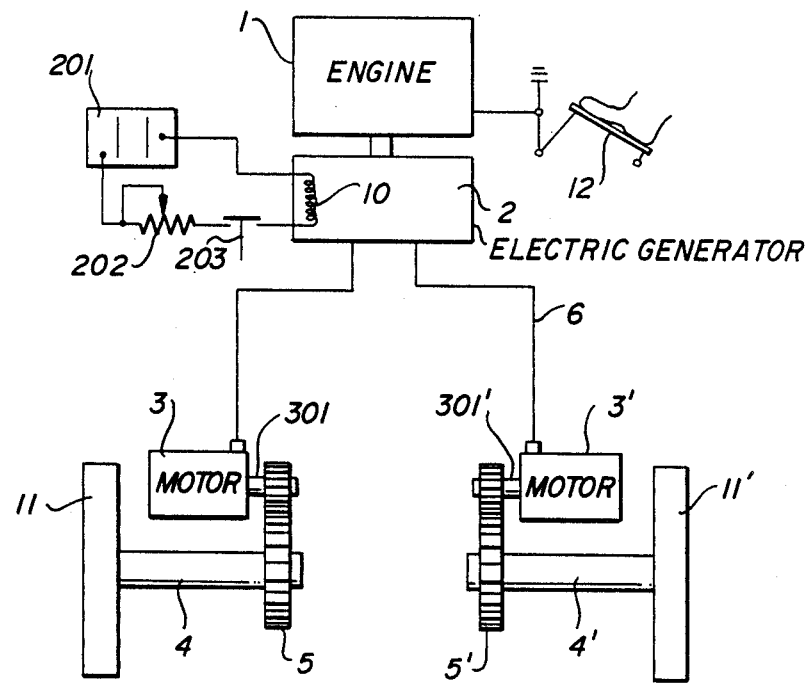
FIG. 1 is a diagram illustrating a motor vehicle according to the invention.

The invention includes an electric generator 2 connected to the engine 1 mounted on the vehicle. DC series motors 3,3' are engaged with the reduction gears 5,5' mounted on the rear axles 4,4', respectively, to drive wheels 11,11'. The electric generator 2 is connected to the DC series motors 3,3' through the electric wire 6. The battery 201 provides field current to exciting coils 10 through electric resistance adjusting device 202. Power switch 203 is connected to the brake pedal 7 to disconnect field current through the said electric generator 2. The series motors 3,3' are provided with the rotary change-over switch 8 to reverse direction of rotation.

The operational effect of the invention will now be described in more detail.

As shown in FIG. 1, when a driver desires to run the motor vehicle equipped with the device according to the invention, he first starts the engine 1. The engine begins to operate and the power is transmitted to the electric generator 2 connected to the engine 1. The power transmitted to the electric generator 2 is converted into electric energy. At this time, the electric energy causes the DC series motors 3,3' connected through the electric wire 6 to operate, respectively, and the DC series motors 3,3' rotate the reduction gears 5,5' coupled directly with the rear axles 4,4' and engaged with the shafts 301,301' of the DC series motors 3,3', so that the motor vehicle moves forward. Thus, when the electric generator 2 begins to produce electricity and it is in a state ready for running, it is sufficient for the driver to tread on the vehicle accelerator pedal 12 to increase the speed of the vehicle by increasing power provided to the generator by the engine. When the driver desires to stop or to slow the motor vehicle in the course of running, he treads the brake pedal 7 with a foot so as to operate the brake and cut off the power switch 203, connected to the electric generator 2, mounted on the brake pedal 7. While the electric generator 2 is rotated continuously by the engine 1, the power switch 203 being cut off, the electric current flows no longer through the exciting coils 10 wound on the electromagnetic poles 9, and no electric power is thereby produced by the electric generator 2. Consequently, no power is transmitted by electricity to each DC series motor 3,3' engaged with the reduction gears 5,5' mounted on the rear axles 4,4', and the motor vehicle loses its propulsive force. The motor vehicle which has lost its propulsive force, runs slowly, and the power switch 203 connected to the brake pedal 7 plays the role of a clutch mounted on the existing motor vehicle. However, each of DC series motors 3,3' coupled with the rear axles 4,4' rotates the reduction gears 5,5' without interruption by means of the inertia of the rotary power of rear axles 4,4' so that the DC series motors 3,3' engaged with the reduction gears 5,5' are rotated by the inertia even after the electric power is cut off, and it functions at the same time as a kind of brake. When the driver desires to keep on running without stopping the motor vehicle which has lost its propulsive force as described above, he releases the brake pedal 7 so as to increase again the lost propulsive force by connecting the contact terminals of the power switch 203 connected to the brake pedal 7, and treads on the vehicle engine accelerator pedal 12 to develop the desired speed.

On the other hand, when the driver desires to stop the motor vehicle which as lost its propulsive force, he treads more deeply the brake pedal 7, and the motor vehicle stops by the mechanical function of the existing vehicle brake. When the driver desires to make the motor vehicle to move backward, he changes the rotary change-over switch 8 connected to the DC series motors 3,3'. As the shafts 301,301' of the DC series motors 3,3' rotate reversely, respectively, it makes each of the reduction gears 5,5' rotate reversely so that the rear axles 4,4' are rotated in a reverse direction and the motor vehicle moves backward.

Since the DC series motor 3.3' engaged with the reduction gears 5,5' mounted on the rear axles 4,4' are mounted so as to be separated from each other when the driver desires to change the direction of running, or the motor vehicle runs on an irregular of uneven road surfaces, the number of rotations of each of the rear axles 4,4' depends on the situation of road surface. Accordingly, the DC series motor 3 to which lots of force is applied due to the specific character of the DC series motors 3,3', the rotation number of shaft 301 is reduced and rotates thereby slows the reduction gear 5 mounted on the rear axle 4, while the DC series motor 3' to which small force is applied, becomes fast in the number of rotations, and accordingly rotates more quickly the reduction gear. Therefore, it is possible to change the direction of the motor vehicle by normal steering. When the change of direction is a right-turn or a left-turn, each axle responds to the force applied by the road surface. That is to say, there is no need for a differential gear when steering because the rear axles 4,4' are individually driven by motors 3,3'.

Figure 2:
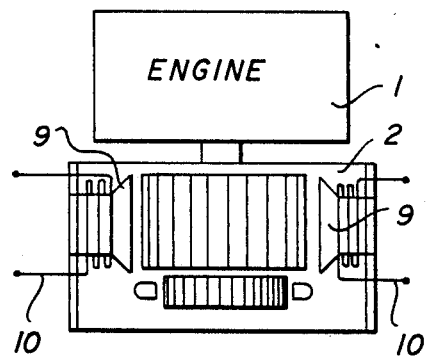
FIG. 2 is a diagram illustrating the electric generator connected to the vehicle engine of FIG. 1.

FIG. 2, which is a diagram showing the connection of the electric generator to the engine shaft of a motor vehicle, illustrates that it is possible to produce the electricity from the electric generator 2 by connecting the electric generator 2 to the engine 1 of a motor vehicle in various ways, that is, by connecting the shaft of electric generator 2 to that of the engine 1 through a belt, chain, gear, etc. In other words, it is possible to position the engine 1 as one pleases, and to reduce the weight of the engine 1 by introducing a high speed engine.

Figure 3:
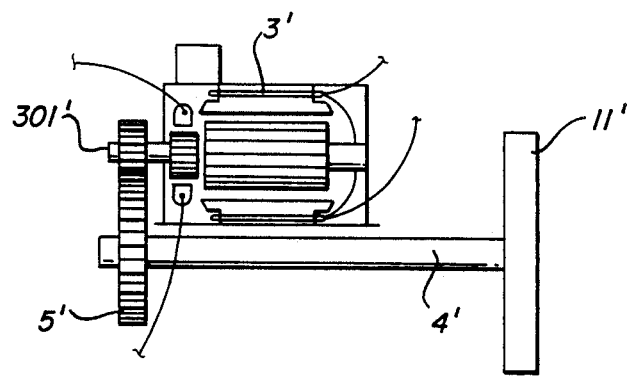
FIG. 3 is a diagram illustrating the series motor mounted on the rear axle of the motor vehicle of FIG. 1.

FIG. 3, which is an illustrative diagram of the DC series motor 3' mounted on the rear axle 4' of motor vehicle, represents that as the shaft 301' of the DC series motor 3' rotates to turn the reduction gear 5' by making the shaft 301 of DC series motor 3' engage with the reduction gear 5' after mounting the reduction gear 5' on the rear axle 4', the reduction gear 5' rotates and at the same time rotates the rear axle 4' to drive wheel 11 so that the motor vehicle can move. Furthermore, it is possible to make a motor vehicle as a front wheel drive type by mounting the said reduction gear 5' and the DC series motor 3' on the front axle, or a four wheel drive type by mounting DC series motors on both the front and rear axles.

Figure 4:
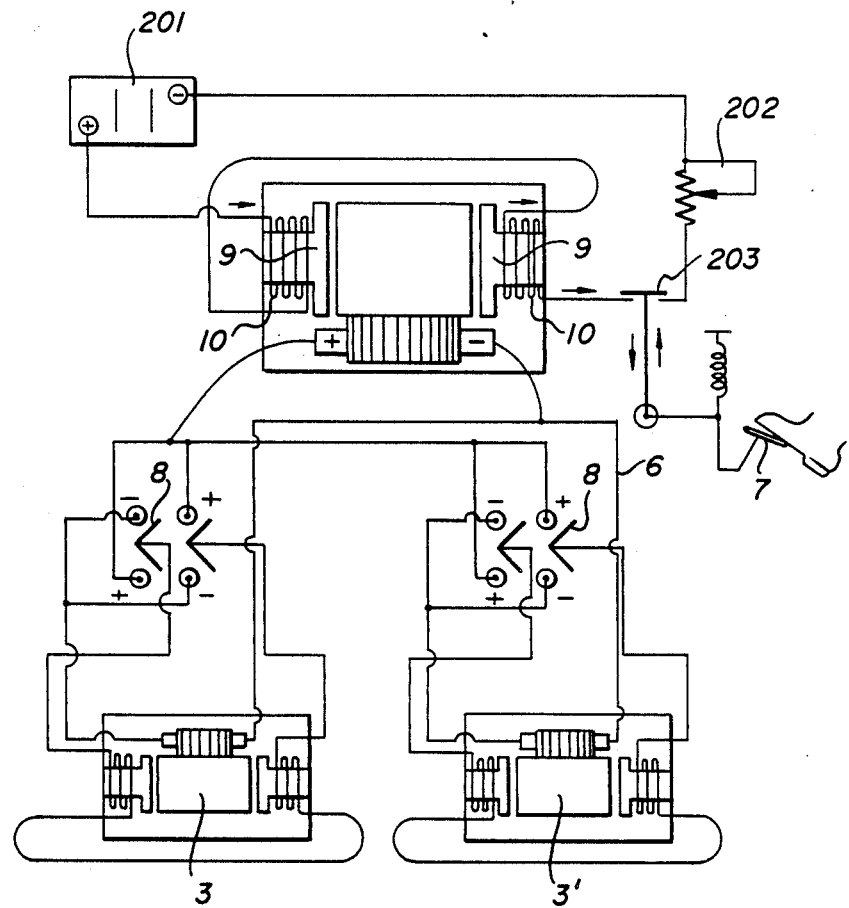
FIG. 4 is a circuit diagram of the invention.

FIG. 4 represents the circuit diagram of the invention. When the motor vehicle runs, the electric generator 2 is rotated by the power transmitted from the engine 1. Accordingly, the exciting coil 10 wound on the electromagnetic pole 9 causes the generator to produce electricity if power switch 203 is closed, by electric current flowing from the battery 201 through the contact terminals of the power switch 203 via the electric resistance regulator 202, and so generated electricity is transmitted to the DC series motors 3,3' along the electric wire 6 to rotate the shafts 301,301' of the DC series motors. When the driver desires to move the motor vehicle backward, he changes the rotary changeover switch 8 connected to the DC series motors 3,3'. This operation reverses the connections to said contact terminals and accordingly rotates the DC series motors 3,3' in the reverse direction so that the reduction gears 5,5' engaged with the DC series motors 3,3' are rotated reversely together with the rear axles 4,4', and may move the motor vehicle backward.

As described above, the invention has a useful and practical effect in that since the engine power is converted into electricity at the electric generator, the operational technique of the motor vehicle is so simple that any beginner drives the motor vehicle easily, and it is also possible to utilize the energy efficiently.

What is claimed is:

1. An electric drive propulsion system for a motor vehicle comprising:

a vehicle having an engine for providing propulsion power thereto, including a vehicle engine accelerator, wherein rotational speed of said engine is controlled exclusively by said vehicle engine accelerator;

an electric generator connected to said engine to be driven thereby, said generator including an exciting coil for causing electric energy to be generated upon excitation thereof, the exciting coil being connected for excitation to a source of DC current through a preset electric resistance adjusting device, such that electric energy output of said generator varies solely with variations of said engine rotational speed;

at least one electric motor mounted on said vehicle and coupled with an axle thereof to drive the axle to provide propulsion for said vehicle, said at least one electric motor being directly connected to said generator by an electric circuit having no intermediate control devices so as to be driven solely by the entire electric energy generated thereby;

said vehicle being provided with a brake and a brake pedal for operating said brake;

a pair of normally closed contact terminals of a power switch connected in said generator excitation circuit between said exciting coil and said source of DC current, said power switch being operated by said brake pedal to open said contact terminals upon application of pressure to said brake pedal and to close said contact terminals upon release of said brake pedal, operation of said brake pedal thereby causing discontinuation of vehicle propulsion and release of said brake pedal causing continuation of propulsion;

such that said at least one electric motor is connected to receive the entire output of electric energy generated by said electric generator as the sole source of energy for propulsion of said vehicle so as to increase and decrease speed of said at least one electric motor both in accordance with increase and decrease of speed of said engine as controlled by said vehicle engine accelerator and continuation and discontinuation of vehicle propulsion as caused by operation of said brake pedal.

2. An electric drive propulsion system as recited in claim 1, further including a change-over switch connected to reverse polarity of electric energy applied to a winding of each said at least one electric motor, such that direction of propulsion of said vehicle is reversed by operation of said change-over switch.

3. An electric drive propulsion system as recited in claim 1, wherein said vehicle includes a plurality of axles each coupled with a separate electric motor to be driven independently thereby, said motors being connected in parallel to said generator to receive the electric energy therefrom as their sole source of propulsion energy.

* * * * *

UNITED STATES PATENT AND TRADEMARK OFFICE
CERTIFICATE OF CORRECTION

PATENT NO.   :   4,953,646
DATED        :   September 4, 1990
INVENTOR(S)  :   Chang H. KIM It is certified that error appears in the above-identified patent and that said Letters Patent is hereby corrected as shown below:

On the cover page, Item [30], "May 8, 1986" should read --Aug. 5, 1986--.

Signed and Sealed this

Twenty-fourth Day of December, 1991

Attest:

HARRY F. MANBECK, JR.

*Attesting Officer*         *Commissioner of Patents and Trademarks*